United States Patent [19]

Jost

[11] 3,956,324
[45] May 11, 1976

[54] ANTHRAQUINONE DYESTUFFS

[75] Inventor: Max Jost, Oberwil, Switzerland

[73] Assignee: Ciba-Geigy Corporation, Ardsley, N.Y.

[22] Filed: Jan. 10, 1975

[21] Appl. No.: 540,058

[30] Foreign Application Priority Data
Jan. 16, 1974  Switzerland............................ 570/74

[52] U.S. Cl. .................................. 260/368; 8/39 C; 8/179; 260/37 NP
[51] Int. Cl.² .................... C07C 97/24; C07C 49/68
[58] Field of Search .................................... 260/368

[56] References Cited
UNITED STATES PATENTS
2,908,684  10/1959  Martin et al. ........................ 260/368
3,483,230  12/1969  Hari et al. ............................ 260/368

Primary Examiner—Arthur P. Demers
Attorney, Agent, or Firm—Vincent J. Cavalieri

[57] ABSTRACT

Anthraquinone dyestuffs of the formula

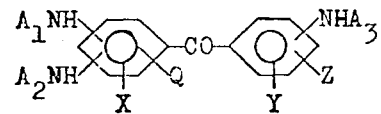

wherein $A_1$, $A_2$ and $A_3$ denote identical or different anthraquinonoid radicals, Q, X, Y and Z denote hydrogen atoms or alkyl groups with 1 to 4 carbon atoms and Z further denotes the radical $A_1NH-$, and the radicals $A_1NH-$ and $A_2NH-$ as well as $A_3NH-$ and Z, if Z denotes the radical $A_1NH-$, are in the m— or p-position relative to one another which are useful for pigmenting thermoplastic polymers in the mass.

3 Claims, No Drawings

ANTHRAQUINONE DYESTUFFS

It is known that the melt-dyeing of linear polyesters makes very great demands on the heat resistance of the dyestuffs to be used, because of the high melting point of the polyester. For example, when extruding films and filaments, a mixture of polyester and dyestuffs is heated to a temperature above the melting point of the polyester, that is to say converted to a melt, and this molten state is maintained for at least 15 minutes and in many cases substantially longer.

In addition to heat resistance, the dyestuffs which can be used for bulk dyeing polyesters must also display the necessary compatibility of the polyester melt, which is at not less than 275°C.

A further requirement made of the dyestuffs is that they are fast to sublimation, that is to say the dyestuffs must not sublime either from the molten polyester moulding composition or from the moulded end product.

Hitherto, only a few categories of dyestuff are known which meet these extreme requirements.

It has now been found that the new anthraquinone dyestuffs of the formula

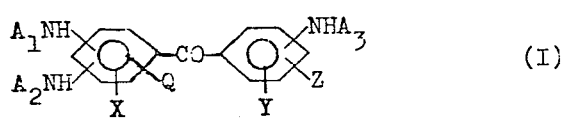
(I)

wherein $A_1$, $A_2$ and $A_3$ denote identical or different anthraquinonoid radicals, Q, X, Y and Z denote hydrogen atoms or alkyl groups with 1 to 4 carbon atoms and Z further denotes the radical $A_1NH-$ and the radicals $A_1NH-$ and $A_2NH-$ as well as $A_3NH-$ and Z, if Z denotes the radical $A_1NH-$, are in the m— or p-position relative to one another, are outstandingly suitable for dyeing thermoplastics in the melt.

Anthraquinonoid radicals to be mentioned are above all the radicals of aminoanthraquinones, especially those of $\alpha$—aminoanthraquinones. Further possibilities are anthraquinone or anthrone radicals which contain a fused benzene ring or hetero-ring, such as, for example, the benzanthrone, pyrazolanthrone, isothiazolanthrone, anthrapyrimidine or anthrapyridone radicals. Examples which may be mentioned are the radicals of isothiazolanthrone, 3-methylanthrapyridone, anthraquinone-2,1(N),1',2'(N)-benzacridone and anthraquinone-2,1(S), 1',2'(S)-thioxanthone.

The new anthraquinone dyestuffs preferably correspond to the formula

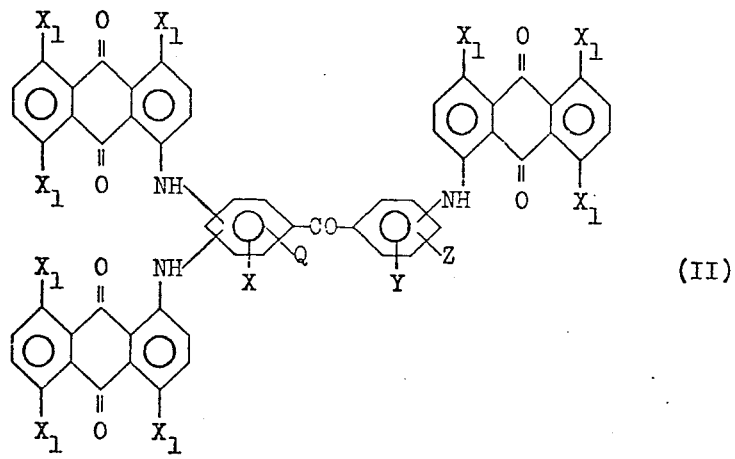
(II)

wherein Q, X, Y and Z have the meaning indicated in the formula I and one $X_1$ denotes a hydrogen atom or an aryloxy, arylmercapto, arylamino or acylamino group and the remaining $X_1$ denote hydrogen atoms.

Particularly suitable anthraquinone dyestuffs are those of the formula

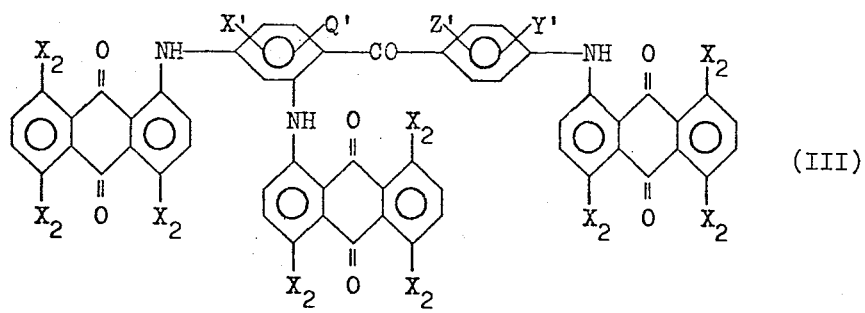
(III)

wherein one $X_2$ denotes a hydrogen atom or a phenoxy, phenylmercapto, phenylamino or benzoylamino group which is optionally substituted by chlorine atoms or methyl or methoxy groups, the remaining $X_2$ denote hydrogen atoms and $Q'$, $X'$, $Y'$ and $Z'$ denote hydrogen atoms or methyl groups. A dyestuff in which $X_2$, $Q'$, $X'$, $Y'$ and $Z'$ represent hydrogen atoms proves to be particularly advantageous.

The anthraquinone dyestuffs according to the invention can be prepared by condensing an aminoanthraquinone or various aminoanthraquinones with a halogenobenzophenone compound of the formula

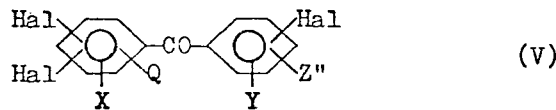

(V)

wherein Hal denotes chlorine or bromine atoms, Q, X, Y and $Z''$ denote hydrogen atoms or alkyl groups with 1 to 4 carbon atoms and $Z''$ in addition denotes a chlorine or bromine atom and the chlorine or bromine atoms are in the m- or p-position to one another, in the molar ratio of 3:1 or, if $Z''$ is a chlorine or bromine atom, in the molar ratio of 4:1.

The preferred starting material is an aminoanthraquinone of the formula

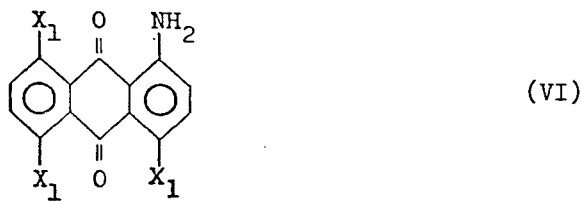

(VI)

wherein one $X_1$ denotes a hydrogen atom or an aryloxy, arylmercapto, arylamino or acylamino group and the remaining $X_1$ denote hydrogen atoms.

In particular, the starting compound used is an aminoanthraquinone wherein one $X_1$ denotes a hydrogen atom or a phenoxy, phenylmercapto, phenylamino or benzoylamino group which is optionally substituted by chlorine atoms or methyl or methoxy groups and the remaining $X_1$ denote hydrogen atoms.

The following compounds may be mentioned as examples: 1-aminoanthraquinone, 1-amino-4-phenoxyanthraquinone, 1-amino-5-phenoxyanthraquinone, 1-amino-4-phenylmercaptoanthraquinone, 1-amino-5-phenylmercaptoanthraquinone, 1-amino-8-phenylmercaptoanthraquinone, 1-amino-4-phenylaminoanthraquinone, 1-amino-4-benzoylaminoanthraquinone, 1-amino-4-(2'-, 3'- or 4'-chlorobenzoylamino)-anthraquinone, 1-amino-5-benzoylaminoanthraquinone, 1-amino-5-(2'-, 3'- or 4'-chlorobenzoylamino)-anthraquinone and 1-amino-8-benzoylaminoanthraquinone.

The compounds of the formula VI are preferably reacted with a trichlorobenzophenone compound of the formula

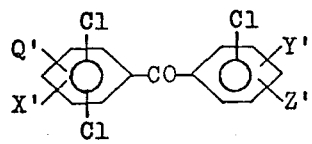

wherein $Q'$, $X'$, $Y'$ and $Z'$ denote hydrogen atoms or methyl groups.

The following may be mentioned as examples of the trihalogenobenzophenone compounds to be used: 2,2',4-trichlorobenzophenone, 2,2',5'-trichlorobenzophenone, 2-methyl-2',4',5-trichlorobenzophenone, 2-methyl-2',5,5'-trichlorobenzophenone, 2-methyl-2',5,6'-trichlorobenzophenone, 2-methyl-3',5,5'-trichlorobenzophenone, 2,4,4'-trichlorobenzophenone, 2,4',5-trichlorobenzophenone, 2,4',6-trichlorobenzophenone, 3,4',5-trichlorobenzophenone, 2-methyl-3,4',5-trichlorobenzophenone, 4-methyl-2',3,5-trichlorobenzophenone, 4-methyl-3,4',5-trichlorobenzophenone, 2,5-dimethyl-2',4,4'-trichlorobenzophenone, and 2,5-dimethyl-2',4,5'-trichlorobenzophenone.

If Z in the formula I represents a fourth aminoanthraquinone radical $A_1NH—$, it is possible to start, for example, from the following tetrachlorobenzophenone compounds: 2,2',4,4'-tetrachlorobenzophenone, 2,2',5,5'-tetrachlorobenzophenone, 2-methyl-2',3,4',5-tetrachlorobenzophenone, 4-methyl-2',3,5,5'-tetrachlorobenzophenone, 4-methyl-2',3,4',5-tetrachlorobenzophenone and 4-methyl-3,3',5,5'-tetrachlorobenzophenone.

The condensations mentioned can be carried out in the usual manner by heating the components in an organic solvent, especially in nitrobenzene, naphthalene or a mixture of diphenyl and diphenyl ether, in the presence of acid-binding agents such as alkali metal carbonates or alkali metal acetates, and catalysts, such as copper or copper compounds.

The colorants obtained are outstandingly suitable for dyeing thermoplastics and after heat-setting exhibit excellent fastness to rubbing, light and migration.

Thermoplastics which can be dyed with the dyestuffs mentioned are, for example, polystyrene and its copolymers, and polycarbonates, but especially linear polyesters.

Linear polyesters to be mentioned especially are those which are obtained by polycondensation of terephthalic acid or its esters with glycols of the formula $HO—(CH_2)_n—OH$, wherein n denotes the number 2–10, or with 1,4-di(hydroxymethyl)cyclohexane, or by polycondensation of glycol ethers of hydroxybenzoic acids, for example p-(β-hydroxyethoxy)-benzoic acid. The term linear polyester also encompasses copolyesters which are obtained by partial replacement of terephthalic acid by another dicarboxylic acid or a hydroxycarboxylic acid and/or by partial replacement of the glycol by another diol.

However, the polyethylene terephthalates are of particular interest.

The linear polyesters to be dyed are appropriately intimately mixed, in the form of powders, chips or granules, with the dyestuff. This can be done, for example, by sprinkling the polyester particles with the finely divided dry dyestuff powder or by treating the polyester particles with a solution or suspension of the dyestuff in an organic solvent and then removing the solvent.

Finally, the colouring substance can also be added directly to the molten polyester or be added before or during the polycondensation of the polyethylene terephthalate.

The ratio of dyestuff to polyester can vary within wide limits depending on the desired depth of colour. In general it is advisable to use 0.01 – 2.5 parts, especially 0.1–2 parts, of dyestuff per 100 parts of polyester.

The polyester particles thus treated are fused in an extruder, and extruded to produce articles, especially films or fibres, or are cast to form sheets, all in accordance with known processes.

Uniformly and intensely coloured articles of high fastness to light or to migration are obtained. The dyed fibres obtainable in accordance with the process are furthermore distinguished by outstanding fastness to wet cleaning and dry cleaning and outstanding rub resistance after heat-setting.

A particular and unforeseeable advantage of the use of the high-molecular dyestuffs according to the invention is that they dissolve in the polyester melt and withstand high temperatures, of up to 300°C, without decomposing, so that substantially clearer dyeings are obtained than when using insoluble pigments.

In the examples which follow the parts, unless stated otherwise, denote parts by weight and the percentages denote percentages by weight.

Example 1

14.3 parts of 2,4,4'-trichlorobenzophenone (J. org. Chem. 14 (1949), 779), 34.5 parts of 1-aminoanthraquinone, 1.5 parts of copper(I) chloride and 15 g of sodium carbonate in 175 parts of nitrobenzene are heated to the boil, whilst stirring, until the reaction has ended (approx. 15 hours). The resulting dyestuff is filtered off when the reaction mixture has cooled, and is washed with nitrobenzene, ethanol and hot water. After drying, it is a dark red powder. The yield is 90% of theory.

Example 2

8 parts of 2,2',4,4'-tetrachlorobenzophenone, 23.2 parts of 1-aminoanthraquinone, 25 parts of sodium carbonate and 12.5 parts of copper(I) chloride in 85 parts of nitrobenzene are heated to the boil for 4 hours, whilst stirring and separating off the water liberated. The mixture is filtered when cold. The reaction product is caused to separate out from the filtrate by adding 600 parts of alcohol and, in order to purify it, is dissolved in 200 parts of warm dimethylformamide, precipitated by pouring the solution into 600 parts of alcohol, filtered off, washed with alcohol and dried. The resulting dyestuff, of melting point 190°–198°C, can be used to bulk-dye polyester in a red shade having very good fastness properties.

Example 3

8.35 parts of 4-methyl-3,3',5,5'-tetrachlorobenzophenone, 23.4 parts of 1-aminoanthraquinone, 12 parts of sodium carbonate and 2 parts of copper(I) chloride in 120 parts of nitrobenzene are heated to the boil for 20 hours whilst stirring. The reaction mixture which has cooled to 80°C is freed from insoluble material by filtration. The reaction product is precipitated by adding 700 parts of ethanol to the filtrate. It is a dark red powder of melting point 275°–277°C and can be used to bulk-dye polyethylene terephthalate in a red shade having very good fastness properties.

Example 4

Example of use in polyesters

Non-delustered polyethylene terephthalate granules suitable for the manufacture of fibres are shaken with 1% of the dyestuff according to Example 1 in a sealable vessel for 15 minutes on a shaking machine. The uniformly dyed granules are spun on a melt spinning installation (285°C ± 3°C, residence time in the spinning machine approx. 5 minutes) to give filaments which are stretched, and wound up, on a stretch-and-twist installation. Because of the solubility of the dyestuff in polyethylene terephthalate, a red dyeing which is distinguished by outstanding fastness to light, excellent fastness to washing and drycleaning, cross-dyeing and sublimation and rub-resistance after heat setting and high resistance to chlorite bleach, results.

Testing the rub resistance after heat-setting a. Heat-setting

A sample of the dyed material is treated for 30 seconds at 210°C in a precision ironing press and is additionally postfixed for 30 minutes at 135°C (SNV 195,833/1961; DIN 54,060/1962; ISO/R 105/IV, Part 2).

b. Testing the rub-resistance

Dry, undyed cotton fabric or polyethylene terephthalate fabric is moved to and fro 10 times over the course of 10 seconds, under a pressure of 900 g, over a 10 cm long sample of the dyed and heat-set material in a Crockmeter. The bleeding onto the undyed material is assessed. (SNV 195,831; DIN 54,021/1958; ISO/R 105, Part 18).

Testing the bleeding during heat-setting

A sample of the dyed material together with undyed comparison fabric (polyester) is treated in a precision ironing press for 30 seconds at 210°C. (SNV 195,833/1961; DIN 54/060/1962; ISO/R 105/IV Part 2).

Examples 5–9

If in Example 1, the 1-aminoanthraquinone is replaced by corresponding amounts of the anthraquinone derivatives listed below, dyestuffs are obtained which can be used to bulk-dye polyethylene terephthalate in the indicated shades, having good fastness properties.

| Example | Anthraquinone derivative | Shade | Melting point |
| --- | --- | --- | --- |
| 5 | 5-Amino-1,9-isothiazolanthrone | Muted red | 261–270°C |
| 6 | 1-Amino-4-benzoylaminoanthraquinone | Grey-violet | 274–287°C |
| 7 | 1-Amino-5-benzoylaminoanthraquinone | Brown-red | 272–283°C |
| 8 | 1-Amino-4-phenylmercaptoanthraquinone | Claret | 212–226°C |
| 9 | 1-Amino-5-phenylmercaptoanthraquinone | Muted red | 215–224°C |

Example 10

8.57 parts of 2,2',4-trichlorobenzophenone, 21 parts of 1-aminoanthraquinone, 9 parts of sodium carbonate and 0.9 part of copper(I) chloride in 90 parts of nitrobenzene are heated to the boil for 16 hours, whilst stirring. When the reaction mixture is cold, the dyestuff which has precipitated is filtered off and washed with nitrobenzene, and ethanol and finally with hot water. The dyestuff melts at between 220° and 250°C and can be used to bulk-dye polyethylene terephthalate in a muted red shade of very good fastness properties.

Examples 11–15

If in Example 2, the 1-aminoanthraquinone is replaced by corresponding amounts of the anthraquinone derivatives listed below, dyestuffs are obtained which can be used to bulk-dye polyethylene terephthalate in the indicated shades, having good fastness properties.

| Example | Anthraquinone derivative | Colour shade | Melting point |
|---------|--------------------------|--------------|---------------|
| 11 | 1-Amino-4-benzoylaminoanthraquinone | Grey-violet | 278–293°C |
| 12 | 1-Amino-5-benzoylaminoanthraquinone | Brown-red | 261–278°C |
| 13 | 1-Amino-4-phenylmercaptoanthraquinone | Claret | 256–260°C |
| 14 | 1-Amino-5-phenylmercaptoanthraquinone | Orange-brown | 233–240°C |
| 15 | 5-Amino-1,9-isothiazolanthrone | Red | 264–281°C |

Example 16

9 parts of 2-methyl-3,4',5-trichlorobenzophenone, 21 parts of 1-aminoanthraquinone, 9 parts of sodium carbonate and 0.9 part of copper(I) chloride in 150 parts of nitrobenzene are stirred for 14 hours at the boil. When the suspension is cold, the reaction product is isolated from it by filtration. The colorant is washed with nitrobenzene and ethanol and finally with hot water. It melts at 250°–260°C and can be used to bulk-dye polyethylene terephthalate in a red shade having very good fastness properties.

Example 17

9.4 parts of 2,5-dimethyl-2',4,5'-trichlorobenzophenone, 21 parts of 1-aminoanthraquinone, 9 parts of sodium carbonate and 0.9 part of copper(I) chloride in 90 parts of nitrobenzene are stirred for 16 hours at the boil. The reaction mixture is cooled to 100°C and freed from insoluble material by filtration. The reaction product is precipitated by pouring the filtrate into 1,200 parts of methanol. The methanol phase is decanted and the portion which remains is dissolved in 250 parts of dimethylformamide, whilst warming. The dyestuff is reprecipitated by pouring the solution into 1,200 parts of methanol. It is filtered off, washed with methanol and dried. The dyestuff, of melting point 180°–185°C, can be used to bulk-dye polyethylene terephthalate in a claret-coloured shade having very good fastness properties.

Example 18

9.4 parts of 2,5-dimethyl-2',4,4'-trichlorobenzophenone, 21 parts of 1-aminoanthraquinone, 9 parts of sodium carbonate and 0.9 part of copper(I) chloride in 90 parts of nitrobenzene are stirred for 18 hours at the boil. When the reaction mixture is cold, the resulting dyestuff is filtered off and washed with nitrobenzene, ethanol and hot water. The dried dyestuff melts at 193°–201°C and can be used to bulk-dye polyethylene terephthalate in a red shade having very good fastness properties.

EXAMPLE 19

8.57 parts of 3,4',5-trichlorobenzophenone, 21 parts of 1-aminoanthraquinone, 9 parts of sodium carbonate and 0.9 part of copper(I) chloride in 90 parts of nitrobenzene are stirred for 20 hours at the boil. After dilution with 60 parts of nitrobenzene, the reaction mixture is cooled to room temperature. The dyestuff which has separated out is filtered off and washed with nitrobenzene, ethanol and hot water. The dyestuff (melting point above 300°C) can be used to bulk-dye polyethylene terephthalate in a red shade having very good fastness properties.

Example 20

If, in Example 19, the 1-aminoanthraquinone is replaced by a corresponding amount of 5-amino-1,9-isothiazolanthrone, a colorant (melting point above 300°C), which can be used to bulk-dye polyethylene terephthalate in a red shade having very good fastness properties, is obtained.

Example 21

On replacing the 1-aminoanthraquinone in Example 19 by a corresponding amount of 1-amino-5-phenylmercaptoanthraquinone a colorant (melting point above 300°C) which can be used to bulk-dye polyethylene terephthalate in a brown-orange-coloured shade having good fastness properties is obtained.

Example 22

8.57 parts of 2,3',4-trichlorobenzophenone, 21 parts of 1-aminoanthraquinone, 9 parts of sodium carbonate and 0.9 part of copper(I) chloride in 90 parts of nitrobenzene are stirred for 19 hours at the boil. When the reaction mixture is cold, the dyestuff formed is filtered off, washed with nitrobenzene, ethanol and hot water and dried. The dyestuff melts at 210°–220°C and can be used to bulk-dye polyethylene terephthalate in a red shade having very good fastness properties.

Example 23

8.57 parts of 2,4',6-trichlorobenzophenone, 21 parts of 1-aminoanthraquinone, 9 parts of sodium carbonate and 0.9 part of copper(I) chloride in 90 parts of nitrobenzene are stirred for 16 hours at the boil. When the reaction mixture is cold, the undissolved materials are removed by filtration and the filtrate is gradually stirred into 1,200 parts of ethanol. After being left to stand for one hour, the alcohol phase is decanted and the portion which remains is dissolved in dimethylformamide, whilst warming. The dyestuff is re-precipitated by pouring the solution into ethanol and is filtered off, washed with ethanol and dried. The dyestuff melts at 182°–204°C and can be used to bulk-dye polyethylene terephthalate in a red shade having very good fastness properties.

Example 24

9 parts of 4-methyl-3,4',5-trichlorobenzophenone, 21 parts of 1-aminoanthraquinone, 9 parts of sodium carbonate and 0.9 part of copper(I) chloride in 90 parts of nitrobenzene are stirred for 16 hours at the boil. The reaction mixture, when cold, is filtered and stirred into 400 parts of methanol. After being left to stand for one hour, the methanol phase is decanted and the crude product which remains is dissolved in a little dimethylformamide. The dyestuff is precipitated by adding methanol to the dimethylformamide solution. The resulting dyestuff melts at 185°–194°C and can be used to bulk-dye polyethylene terephthalate in a red shade having very good fastness properties.

Example 25

9 parts of 4-methyl-3,4',5-trichlorobenzophenone, 13.4 parts of 1-aminoanthraquinone, 10.25 parts of 1-amino-4-benzoylaminoanthraquinone, 9 parts of sodium carbonate powder and 0.9 part of copper(I) chloride in 90 parts of nitrobenzene are stirred for 24 hours at the boil. The reaction mixture is freed from nitrobenzene by steam distillation. The dyestuff is filtered off, washed with water and dried; it melts at 185°–193°C and can be used to bulk-dye polyethylene terephthalate in a claret-coloured shade having very good fastness properties.

Example 26

8.35 parts of 4-methyl-2',3,4',5-tetrachlorobenzophenone, 23.4 parts of 1-aminoanthraquinone, 12 parts of sodium carbonate and 2 parts of copper(I) chloride in 120 parts of nitrobenzene are heated to the boil for 15 hours, whilst stirring. The reaction mixture is then stirred for 4 hours at 75°C and thereafter the reaction product which has precipitated is filtered off. The dyestuff is washed with nitrobenzene, ethanol and hot water, and dried. It melts above 300°C and can be used to bulk-dye polyethylene terephthalate in a red shade having very good fastness properties.

Examples 27–29

If in Example 26, the 1-aminoanthraquinone is replaced by corresponding amounts of the anthraquinone derivatives listed below, colorants are obtained which can be used to bulk-dye polyethylene terephthalate in the indicated shades, having good fastness properties.

| Example | Anthraquinone derivative | Colour shade | Melting point |
|---|---|---|---|
| 27 | 1-Amino-4-benzoylaminoanthraquinone | Grey-violet | Over 300°C |
| 28 | 1-Amino-5-phenylmercaptoanthraquinone | Brown-orange | 241–259°C |
| 29 | 5-Amino-1,9-isothiazolanthrone | Brown-red | 277–289°C |

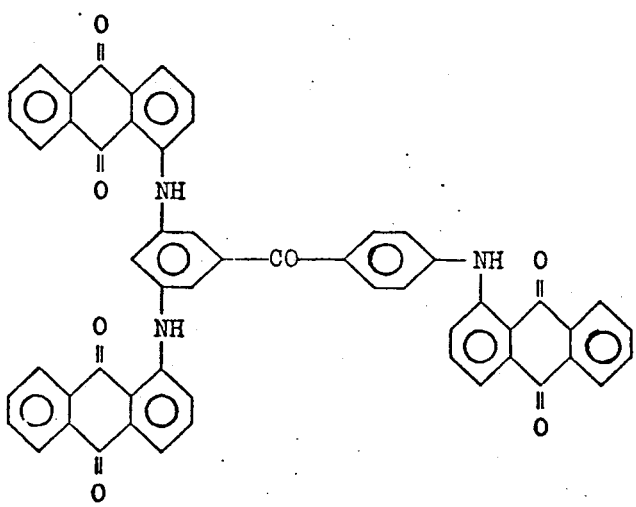

I claim:
1. A dyestuff of the formula

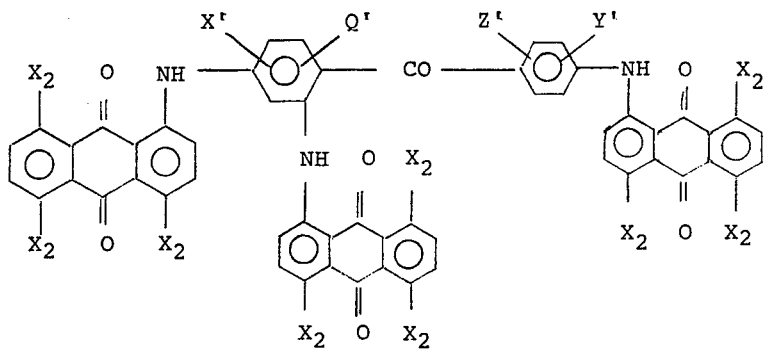

wherein one $X_2$ is hydrogen, phenoxy, phenylmercapto, phenylamino, benzoylamino which may be substituted by chloro, methyl or methoxy, the remaining $X_2$ is hydrogen, and $Q'$, $X'$ and $Z'$ is hydrogen or methyl.

2. Dyestuff according to claim 1, of the formula

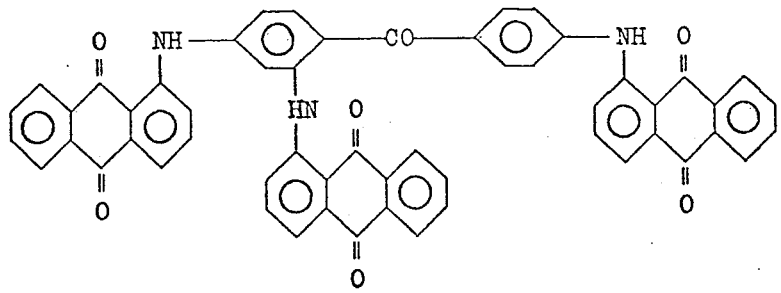

3. Dyestuff according to claim 1, of the formula